Nov. 30, 1943.    W. A. TURNER    2,335,622
MANUFACTURE OF HOT TOPS
Filed April 28, 1943
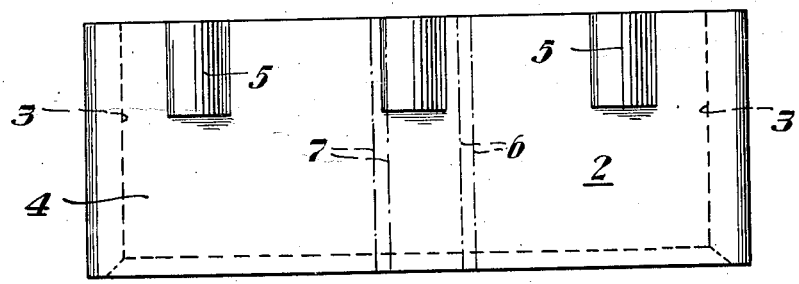
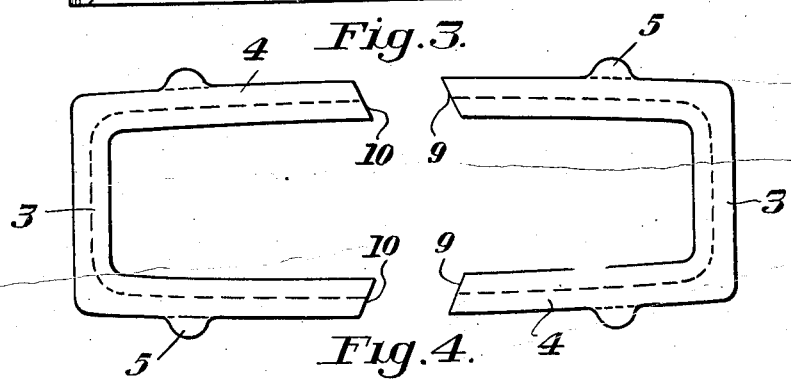
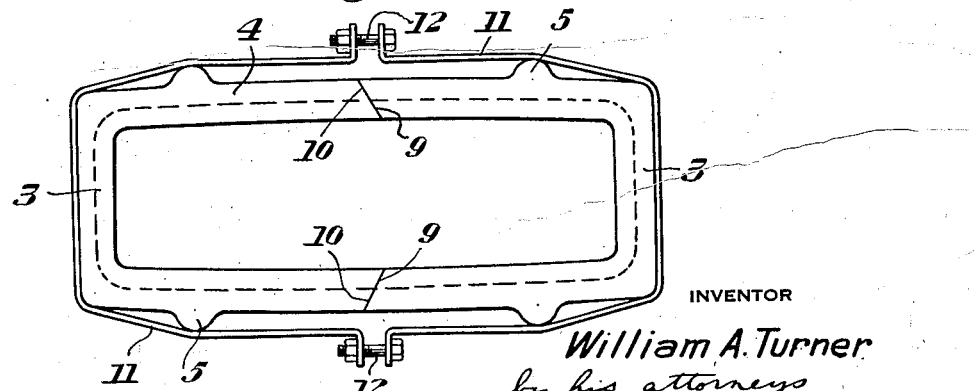
INVENTOR
William A. Turner
by his attorneys
Stebbins and Blenko Patented Nov. 30, 1943

2,335,622

UNITED STATES PATENT OFFICE 2,335,622

MANUFACTURE OF HOT TOPS

William A. Turner, Mount Lebanon Township, Allegheny County, Pa., assignor to The McLain Fire Brick Company Application April 28, 1943, Serial No. 484,804

7 Claims. (Cl. 22—193)

The present invention relates to sectional hot tops, and more particularly to the method of manufacturing such hot tops.

It is customary in the art to which the present invention relates to utilize hot tops or feeders with ingot molds for the purpose of maintaining a pool of molten metal available for feeding the shrinkage of the metal in the mold and thereby decrease segregation and piping. Hot tops are ordinarily constructed of refractory material. There is a limit to the size of hot tops which can be economically constructed and shipped in one piece and, consequently, it has been customary to manufacture such hot tops in sections. Turner Patent No. 1,666,759 and Turner et al. Patent No. 2,049,981 disclose several ways for manufacturing hot tops in sections which are convenient and economical from the standpoint of production and shipping. In making sectional hot tops, it has heretofore been necessary to separately extrude or mold each individual section. As is shown in the Turner et al. Patent No. 2,049,981, it has been necessary to provide a cross bar extending between oppositely disposed sides of each section during the molding or extrusion thereof in order to provide the desired rigidity of the molded or extruded article. Such cross bars are, of course, removed subsequent to the extrusion or molding and baking operations. This method has been found to be somewhat expensive and inconvenient. It is quite expensive to provide molding and extrusion apparatus which will permit the manufacture of a large number of different sizes of hot tops such as are required by the trade and, consequently, as is shown in the Turner et al. patent, short sections have been positioned between the main end sections of the hot top so as to make the assembled hot top larger or smaller, as may be desired by the user.

The present invention provides a method of manufacturing hot tops whereby a unitary shape can be formed either by molding or by extrusion and which can be used as a one piece hot top or broken into sections subsequent to the forming or baking operations to provide sections which, either alone or in conjunction with molded inserts, will form a hot top of the required size. Hot tops larger than the one piece extruded or molded piece can be formed by severing the unitary shape into two parts and placing extruded or molded inserts between the ends thereof or hot tops any desired size smaller than the molded or extruded one piece brick can be formed by removing a section of any desired size from the side walls thereof. The extruded or molded one piece brick can be suitably scored during the extruding or molding operation and the brick broken along the score lines after the baking or curing thereof. My invention also provides a method of manufacturing sectional hot tops whereby the finished sections to be assembled on the ingot mold have beveled faces, the bevels on opposite sides extending in opposite directions, whereby the sections will be more positively held in proper position relative to each other when mounted on the ingot mold.

In the accompanying drawing I have illustrated the manufacture of hot tops in accordance with the present invention. It will be understood, however, that the drawing is merely for illustrative purposes, and my invention may be otherwise practiced within the scope of the appended claims.

In the drawing,

Figure 1 is a plan view of the molded or extruded unitary shape;

Figure 2 is a side elevational view of the shape shown in Figure 1;

Figure 3 is a plan view similar to Figure 1 showing the removable portions of the hot top or extruded shape removed therefrom; and Figure 4 is a plan view of the finished hot top in assembled and bound condition.

In carrying out the present invention, a unitary shape, indicated generally by the reference character 2, is formed by extrusion or molding. This shape comprises integral end walls 3 and side walls 4. The side walls, as is customary, are provided with projections 5 around which the binding strap extends. If the molded or extruded shape is of the desired size for the finished shape it is then dried or cured and is then ready for use. However hot top bricks of various sizes are required by the users and the cost of providing extrusion machines for all the various sizes would be prohibitive. I have found it highly desirable to provide for the manufacture of shapes of various sizes by means of the same equipment utilized for making one piece hot tops. In order to accomplish this, provision is made for scoring the shape during extrusion thereof in such a way that a larger or smaller sectional hot top may be formed.

When a shape smaller than the extruded shape is desired, score lines 6 and 7 are formed on the side walls of the hot top during the extruding or molding operation so that after the molding or baking operation the sections 8 between the score lines can be removed readily. The score lines on each wall are parallel to each other so that when the removable portion 8 is cut from the unitary shape, mated beveled faces 9 and 10 will be provided on the two sections of the hot top. The score lines on each wall extend at an acute angle relative to the side walls for providing these beveled faces and the score lines on opposite walls extend at an angle relative to each other so that in the finished product the beveled faces on opposite sides will be oppositely positioned.

After the extruding and scoring operations are performed, the removable sections 8 can be removed or the shape can be baked and the removable sections removed thereafter. Whenever desirable, the removable portions can be allowed to remain in the shape during the transportation thereof and removed just before the hot top is mounted on the ingot mold. This tends to prevent breakage of the sections of the hot top during transportation because the unitary shape possesses greater rigidity than the separate sections when in the condition illustrated in Figure 3.

After the removable sections 8 are cut from the unitary shape, the two end sections may be brought together in the manner shown in Figure 4. As illustrated there, the beveled faces are brought together and the two parts may be held in this position, if desired, by a strap 11 provided with a tightening bolt 12.

The distance between the score lines 6 and 7 on each wall can be modified in order to provide hot tops of different sizes. Where a small hot top is required, the score lines 6 and 7 may be spaced apart appreciably, and where a larger hot top is required they can be positioned closer together. This can be accomplished in either a molding or extrusion operation. Where the unitary section is formed by extrusion, it is merely necessary to move the scoring blades closer together or farther apart in order to provide a wide range of sizes smaller than the extruded shape.

Whenever a brick larger than the extruded shape is desired only one score line on each side wall of the shape need be made during the extrusion operation. In such a case the score lines preferably should be angularly disposed in relation to the wall edges after extrusion and before or after the baking operation the shape may be broken along the score lines and suitable inserts placed in the side walls between the ends of the sections. These inserts may be of any size required to provide the proper size of finished hot top.

Thus it will be seen that my invention provides for the manufacture of a wide variety of sizes of hot top bricks from a single extrusion apparatus.

In the foregoing specification I have referred to both molding and extrusion methods of manufacturing hot tops. It will be understood that my invention can be practiced where either type of operation is employed, and that the term "extrusion," as used in the appended claims, is intended to cover either the formation of the shape by a molding or an extrusion method.

I claim:

1. The method of making hot tops comprising the steps of forming a unitary hot top by extrusion, scoring each of two opposing side walls of the hot top during the extrusion, and thereafter severing the hot top along the score lines.

2. The method of making hot tops comprising the steps of forming a unitary hot top by extrusion, scoring each of two opposing side walls of the hot top during the extrusion, thereafter severing the hot top along the score lines, and thereafter forming a sectional hot top with inserts positioned between the severed walls of the hot top.

3. The method of making hot tops comprising the steps of forming a unitary shape by extrusion, scoring each of two opposing side walls of the shape at spaced points during the extrusion thereof, and thereafter removing the portions between the score lines on said walls.

4. The method of making sectional hot tops comprising the steps of forming a unitary shape by extrusion, scoring each of two opposing side walls of the shape at spaced points during the extrusion thereof to permit subsequent removal of the portions between the score lines, the score lines on opposite walls being positioned opposite each other, and thereafter removing the portions between the score lines.

5. The method of making sectional hot tops comprising the steps of forming a unitary shape by extrusion, scoring each of two opposing side walls of the shape at spaced points during the extrusion thereof, the score lines on each side wall extending at an acute angle relative thereto, and thereafter removing the portions between the score lines.

6. The method of making sectional hot tops comprising the steps of forming a unitary shape by extrusion, scoring each of two opposing side walls of the shape at spaced points during the extrusion thereof, the score lines on each side wall being parallel to each other and extending at an acute angle relative to the side wall, and thereafter removing the portions between the score lines.

7. The method of making sectional hot tops comprising the steps of forming a unitary shape by extrusion, scoring each of two opposing side walls of the shape at spaced points during the extrusion thereof, the score lines on each side wall extending at an acute angle relative thereto and the score lines on opposing side walls being disposed at an angle relative to each other, thereafter removing the portions between the score lines, and assembling the remaining portions to form the hot top.

WILLIAM A. TURNER.